Oct. 18, 1927.  
S. M. BLANCH ET AL  
METAL CUTTING TOOL  
Filed March 16, 1927

1,645,736

Inventors  
Sven M. Blanch  
George W. Fleming  
By Attorneys  
Southgate Fay & Harley Patented Oct. 18, 1927.

1,645,736

UNITED STATES PATENT OFFICE.

SVEN MALCOLM BLANCH AND GEORGE W. FLEMING, OF WORCESTER, MASSACHUSETTS, ASSIGNORS TO FLEMING MACHINE COMPANY, OF WORCESTER, MASSACHUSETTS, A CORPORATION OF MASSACHUSETTS.

METAL-CUTTING TOOL.

Application filed March 16, 1927. Serial No. 175,858.

This invention relates to that type of metal cutting tools in which the tool itself is circular and is arranged to produce a circular cut.

The principal objects of the invention are to provide a simplified way of mounting the circular tool on the spindle and secure a positive connection with the spindle; to provide a tool for performing the cutting operation formed of a single piece of metal so that it will always retain its shape and avoid material projections inside the tool and all projections outside the tool so that the cutter can be used to cut a groove substantially throughout the height of the cutter.

Other objects and advantages of the invention will appear hereinafter.

Reference is to be had to the accompanying drawings in which

Figure 1:
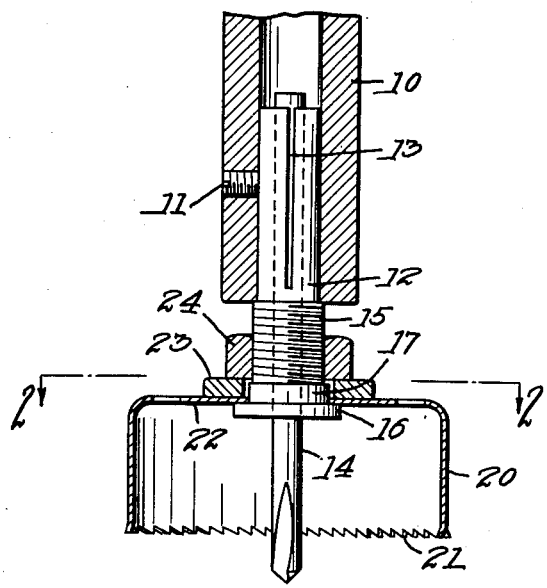
Figure 2:
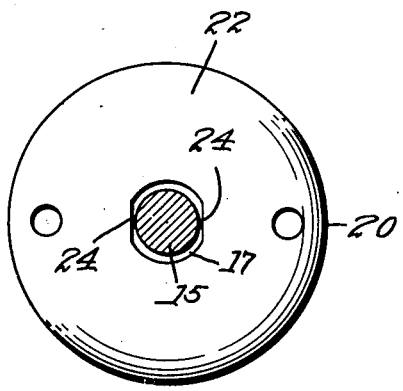

Fig. 1 is a central sectional view of a tool constructed in accordance with this invention and the means for mounting it on the spindle for driving it; and Fig. 2 is a sectional view on the line 2—2 in Fig. 1.

The invention as stated, relates to a circular cutting tool for cutting circles in a plane at right angles to the spindle on which it is mounted. We have shown the tool as applied to a driving spindle 10 by means of set screw 11 or any other desired way. The shank 12 of the tool is hollow and provided with a longitudinal slit 13 to receive the shank of a pilot drill 14 and to provide for the clamping of the pilot to the shank by the same means 11 that is used for holding the shank 12 in place in the hollow end of the spindle 10.

The shank 12 is provided with a screw-threaded portion 15 below the end of the spindle 10 and with a shoulder fitting up against the bottom of the spindle to provide a positive means for receiving pressure therefrom. This shank is provided also at its end with a circular flange 16 through which the pilot drill 14 passes and with a hub or shoulder 17 behind it.

The cutter itself consists of a cylindrical cup-shaped sheet steel member 20 having saw teeth 21 arranged in a circle or an arc at the bottom. The teeth are offset alternately in opposite directions as is usual with saws. This results in the outer edge of the saw teeth projecting a little beyond the cylindrical surface of the cup 20, both inwardly and outwardly, so that this cylindrical wall will pass into any groove which is cut by the teeth. The cup has a flat bottom 22 integral with the cylindrical part of the cutter 20 provided with a perforation 23 which is of a circular nature but has flat sides 24 in the form shown. Any non-circular opening will serve the purpose. The hub 17 is similarly shaped to provide a positive driving means for the saw so that it will not turn with respect to the shank 12 but will always be driven positively by it. On the upper or back side of the bottom 22 is a collar 23 deeper than the hub 17 so as to receive the thrust from a fastening nut 24 which is mounted on the screw-threaded portion 15. This nut can be fastened up below and it acts against solid members 23 and 16 to clamp the center of the bottom 22 between them and hold it in fixed position at all times.

This tool is used like the ordinary tools of this general type and ordinarily cuts a circular groove whether the teeth 21 extend all the way around the circumference or not.

By the use of this arrangement, it is obvious that the pilot drill 14 is firmly fixed in central position; that the cutter is firmly held against movement relative to the shank 12, either circumferentially or longitudinally and that the shank 12 is held firmly in the spindle 10 by a simple set screw 11 and that this also clamps the shank of the pilot drill 14. The formation of a tool in this shape greatly reduces the expense of construction and simplifies the device. The clamping of the parts in this manner also simplifies the assembly and the disassembly of the parts. The cutter can be sunk in the metal up to the collar 16 without any hindrance from anything inside or outside the cutter and the cutter itself is rigid and accurate in its operation.

Although we have illustrated and described only a single form of the invention we are aware of the fact that modifications can be made therein by any person skilled in the art without departing from the scope of the invention as expressed in the claims. Therefore, we do not wish to be limited to all the details of construction herein shown and described, but what we do claim is:—

1. In a circular metal cutting tool, the combination with a hollow spindle for driving it, a hollow shank for the tool having a split portion entering the spindle, a pilot drill passing up through the hollow shank of the tool, and a set screw engaging the split shank for holding the shank of the tool and the shank of the spindle firmly in position in the driving spindle.

2. In a metal cutting tool, the combination with a shank having a screw threaded portion and provided with a non-circular hub, a cutting tool having a bottom provided with a non-circular opening fitting the hub, and a nut on the threaded portion for securing the tool to the shank.

3. In a metal cutting tool, the combination with a cup shaped cutter having teeth on the edge of its cylindrical portion and provided with an outside collar around the center of its bottom, a spindle therefor having a shouldered flange engaging the inside of the bottom of the cutter and passing through the same, the shank having a screw threaded portion, and a nut on the screw threaded portion for clamping the bottom of the cutter between the collar and flange.

4. As an article of manufacture, a circular metal cutting tool consisting of a cylindrical body having saw teeth at its open end and provided with an integral bottom at right angles thereto by which it is secured to a driving spindle.

In testimony whereof we have hereunto affixed our signatures.

SVEN MALCOLM BLANCH.
GEORGE W. FLEMING.